United States Patent Office 3,445,811

Patented May 20, 1969

3,445,811

ERROR SYSTEM FOR LOGIC CIRCUITS

Masao Hashimoto, Kanagawa Prefecture, and Akira Yamaguchi and Hironobu Nishimura, Kawasaki-shi, Japan, assignors to Fujitsu Limited, Kawasaki, Japan, a corporation of Japan Filed Aug. 9, 1965, Ser. No. 478,285
Claims priority, application Japan, Aug. 10, 1964, 39/45,515
Int. Cl. G08b *29/00;* G08c *25/00*
U.S. Cl. 340—146.1 12 Claims

ABSTRACT OF THE DISCLOSURE

An error system comprises a logic circuit having a plurality of components connected to each other. Each of the components normally functions to provide an output signal dependent upon an input signal in occurrence and in characteristic. A testing circuit connected to a component of the logic circuit determines the output signal occurrence and characteristic and thereby provides a signal indicative of the operating condition of the component. A control circuit responsive to the testing circuit connects a source of blocking voltage to the output of each of the components of the logic circuit to provide a determined logical condition at the output of each of the components thereby blocking such components upon a determination by the testing circuit of improper operation of one of the components.

The present invention relates to an error system. More particularly, the present invention relates to an error system for logic circuits.

Redundancy systems utilized heretofore generally function in either doubling or partial redundancy manner. A partial redundancy system may function in accordance with *M/N*, where *N*>*M*>1 and N is the number of logic circuits in use and M is the number of logic circuits in reserve. The degree of redundancy of each redundancy system differs in accordance with its code system, but the system with the smallest degree of redundancy is that in which M equals 1.

The principal object of the present invention is to provide a new and improved error system for logic circuits.

In accordance with the present invention, an error system comprises a logic circuit having a plurality of components connected to each other, each of the components having a pair of inputs and a pair of outputs and normally functioning in a binary manner to provide a binary logical output condition at its outputs dependent upon a binary logical input condition at its inputs. Normal voltage means connected to the outputs of each of the components of the logical circuit provides a normal operating voltage and thereby provides a determined logical output condition at the outputs of each of the components. Blocking voltage means provides a blocking voltage. Testing means connected to the outputs of a component of the logic circuit determines the logical output condition and thereby the operating condition of the component. Control means connected to the testing means switches the blocking voltage means in place of the normal voltage means to the outputs of each of the components of the logic circuit to provide the blocking voltage and thereby provide a logical binary condition opposite the determined logical condition at the output of each of the components thereby blocking the components upon a determination by the testing means of improper operation of one of the components.

Figure 1A:
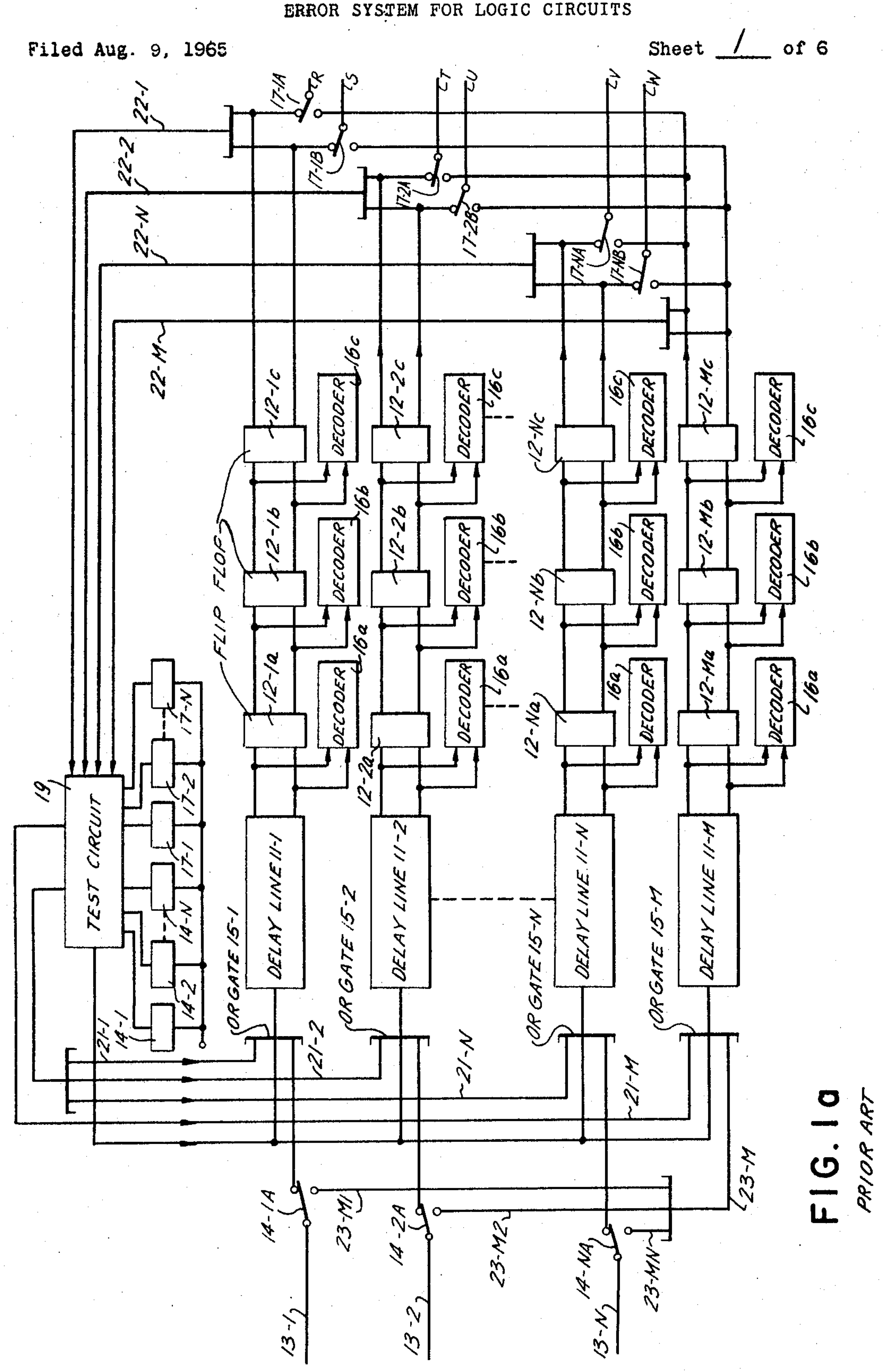
FIG. 1a PRIOR ART
Figure 1B:
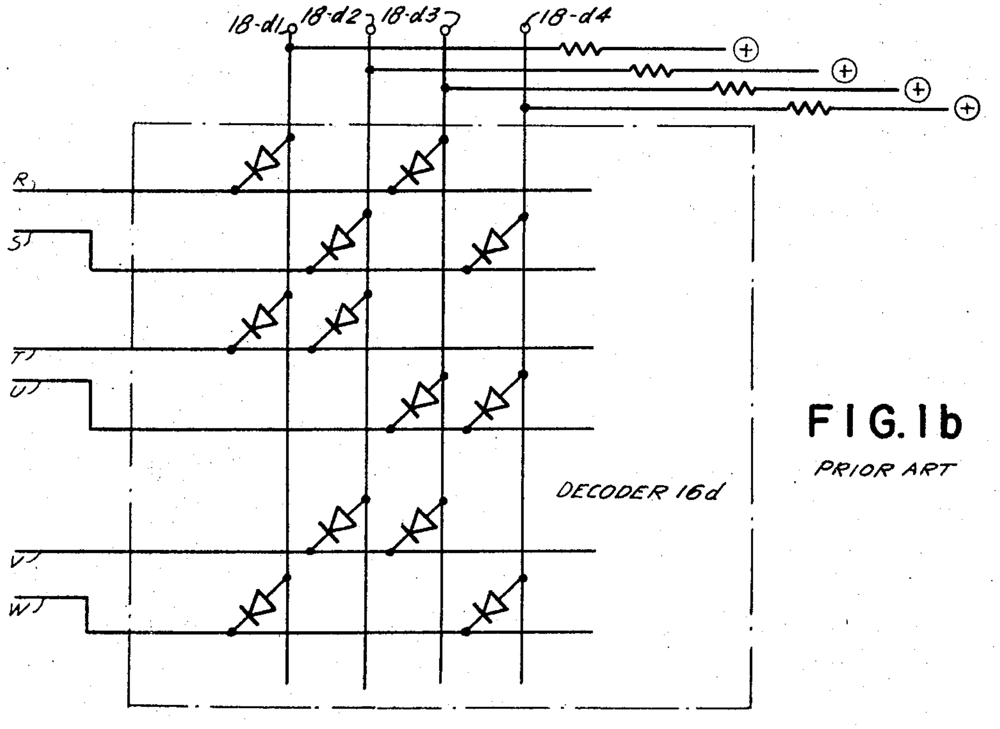
Figure 2B:
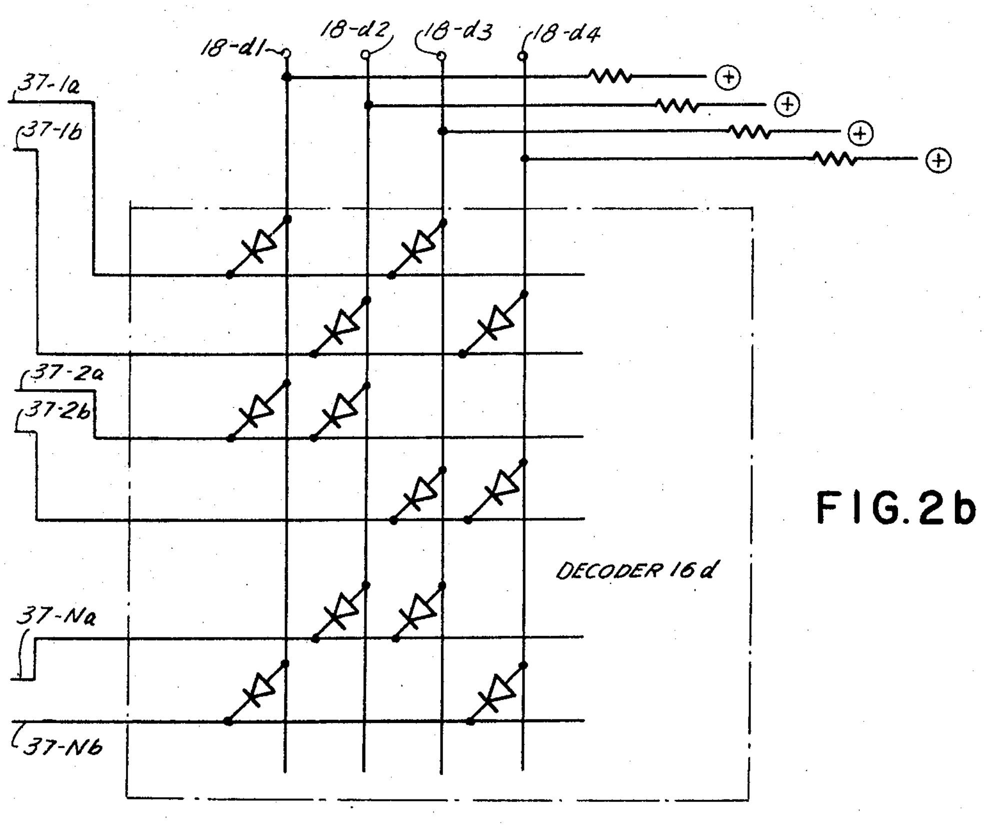
Figure 2A:
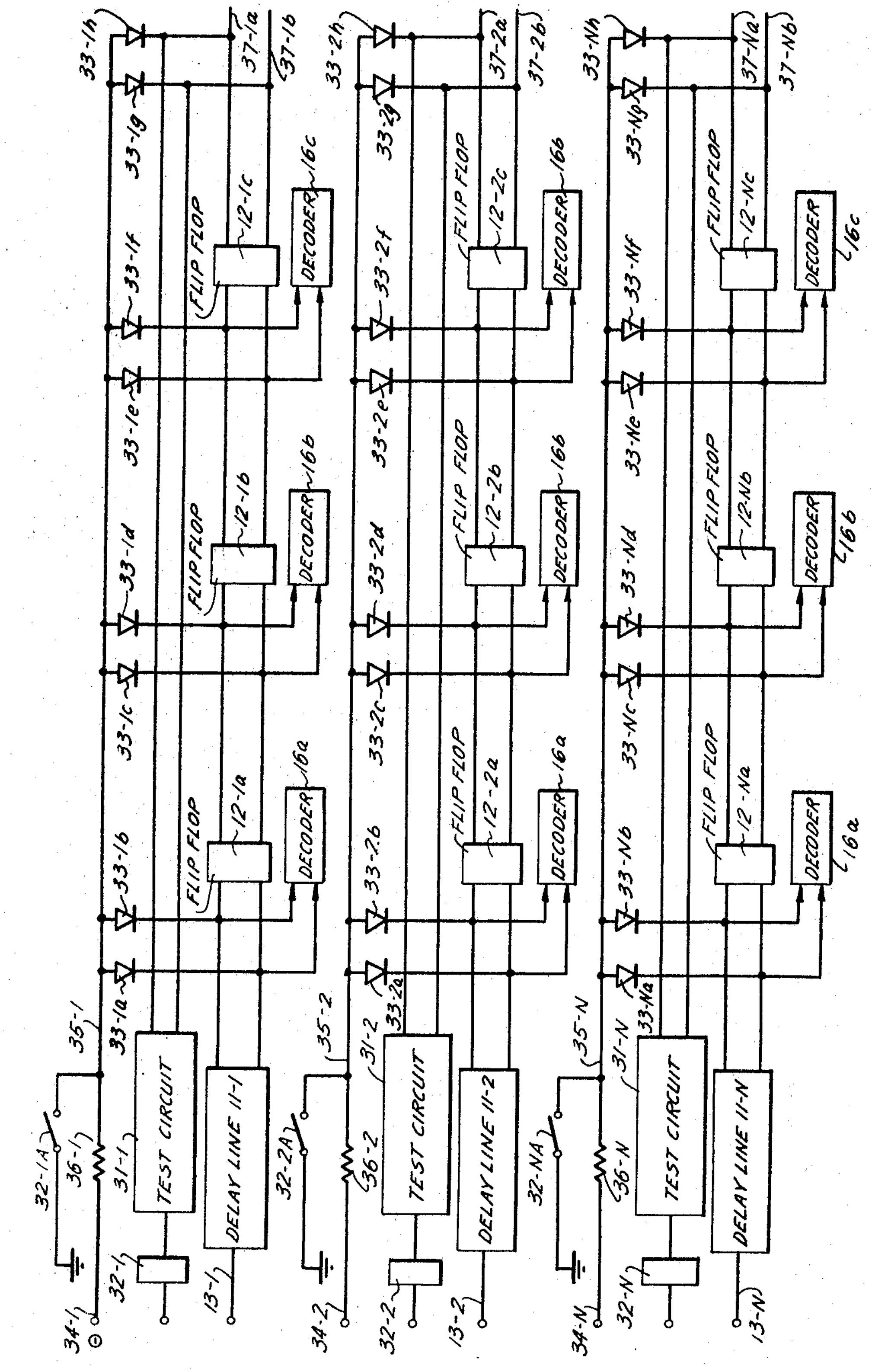
Figure 3A:
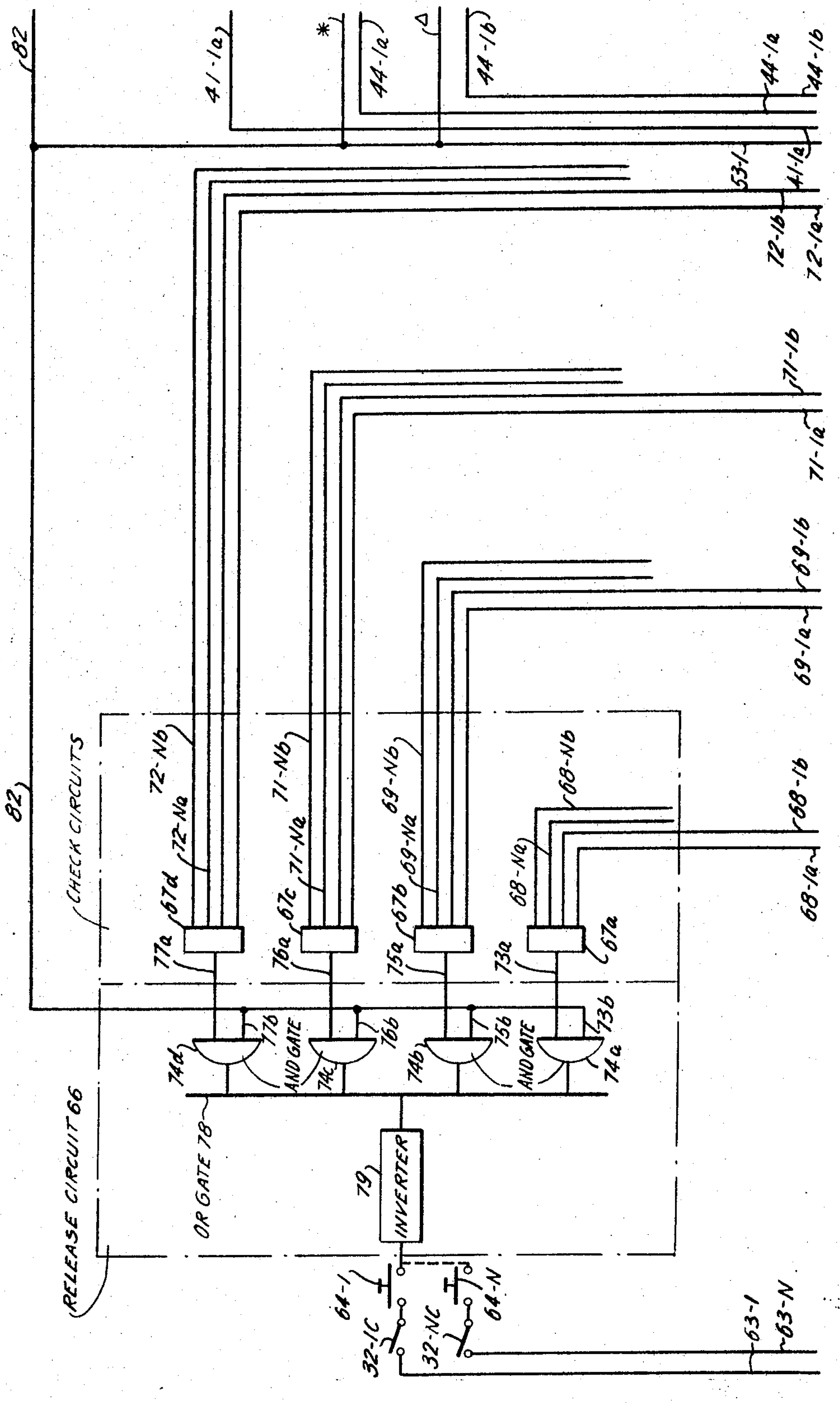
Figure 3B:
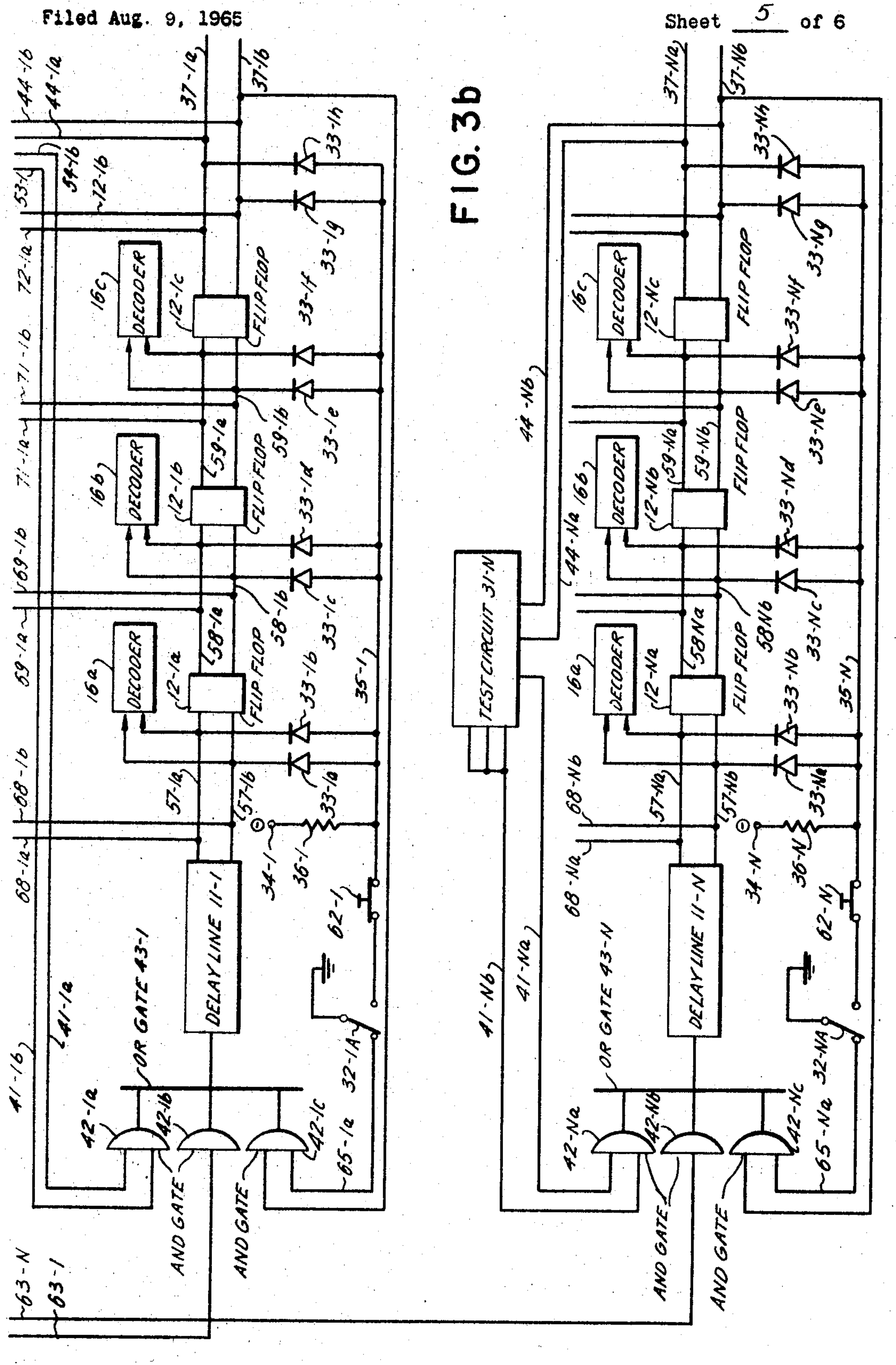
Figure 3C:
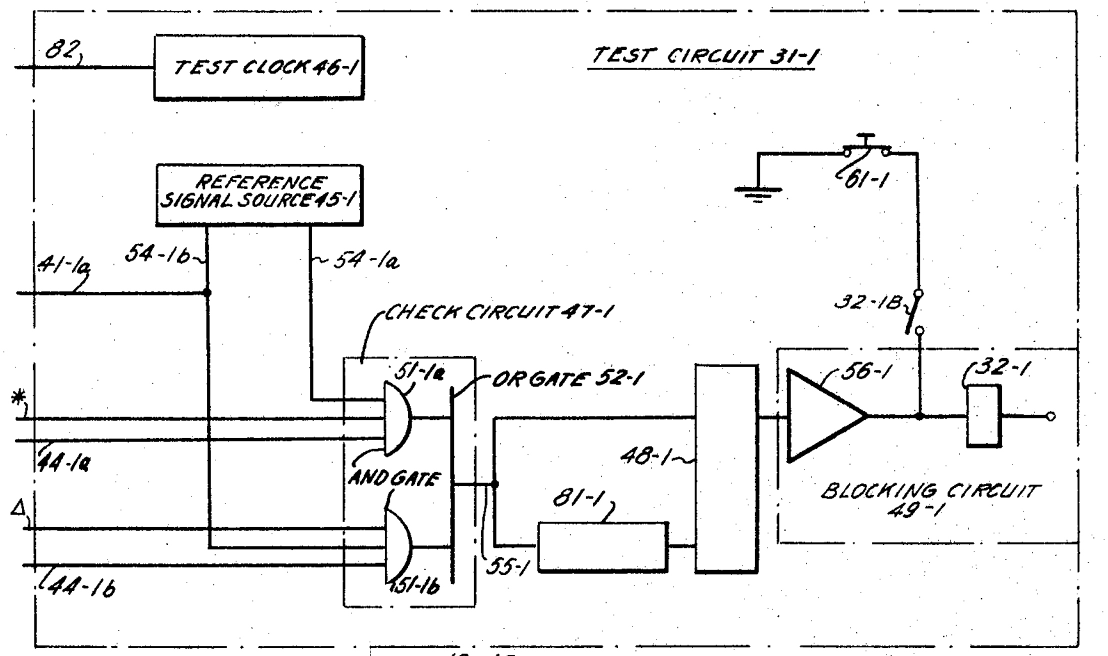
Figure 3D:
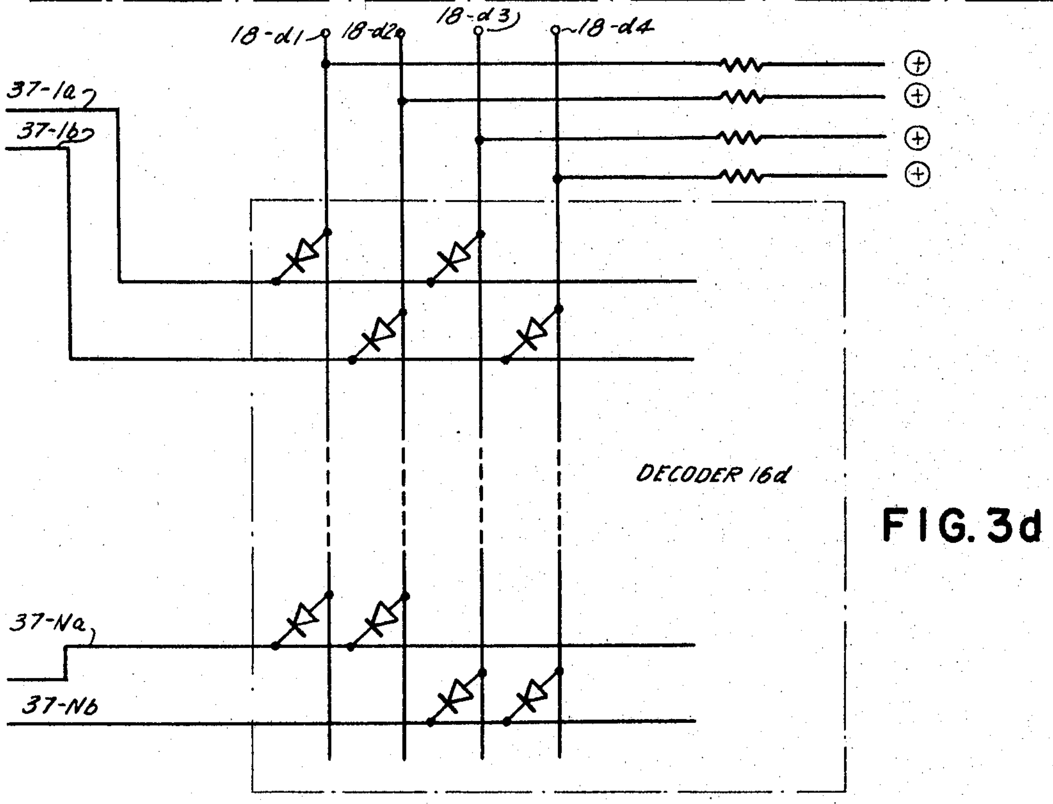

In order that the present invention may be readily carried into effect, it will now be described with reference to the accompanying drawings, wherein:

FIG. 1, which includes FIGS. 1*a* and 1*b*, is a schematic block diagram of an embodiment of a prior art partial redundancy system;

FIG. 2, which includes FIGS. 2*a* and 2*b*, is a schematic block diagram of an embodiment of the error system of the present invention in simplified form; and FIG. 3, which includes FIGS. 3*a*, 3*b*, 3*c*, and 3*d*, is a schematic block diagram of the embodiment of FIG. 2 in greater detail.

In the figures, the same components are identified by the same reference numerals.

In the prior art partial redundancy system of FIG. 1, there are N logic circuits in use and one logic circuit in reserve, so that *M/N* equals 1/*N*. Each of the N logic circuits in use comprises a delay line storage device 11–1, 11–2, 11–3 . . . 11–N, respectively, and three bistable multivibrators or flip-flops connected in series with the output of the corresponding delay line. The logic circuit M in reserve comprises a delay line storage device 11–M and three bistable multivibrators or flip-flops connected in series with the output of said delay line.

Thus, flip-flops 12–1*a*, 12–1*b* and 12–1*c* are connected in series with the output of the delay line 11–1, flip-flops 12–2*a*, 12–2*b* and 12–2*c* are connected in series with the output of the delay line 11–2, and flip-flops 12–N*a*, 12–N*b* and 12–N*c* are connected in series with the output of the delay line 11–N. Flip-flops 12–M*a*, 12–M*b* and 12–M*c* are connected in series with the output of the delay line 11–M. The logic circuits function in accordance with check codes or codes utilizing check bits.

In each of the N logic circuits, in normal operation, an input signal is fed through an input line 13–1, 13–2 . . . 13–N, respectively, to the corresponding delay line 11–1, 11–2 . . . 11–N, respectively, via a corresponding input switch 14–1A, 14–2A . . . 14–NA respectively, and a corresponding OR gate 15–1, 15–2 . . . 15–N, respectively. The input signal is read out from each of the delay lines 11–1, 11–2 . . . 11–N, after a determined period of time. The output signal of each of the delay lines 11–1, 11–2 . . . 11–N is fed to four decoders.

The output signal read out from the delay line 11–1 is fed directly to a decoder 16*a*, to a decoder 16*b* via the flip-flop 12–1*a*, to a decoder 16*c* via the flip-flops 12–1*a*, and 12–1*b*, and to a decoder 16*d* via the flip-flops 12–1*a*, 12–1*b* and 12–1*c* and via output switches 17–1A and 17–1B. The output signal read out from the delay line 11–2 is fed directly to the decoder 16*a*, to the decoder 16*b* via the flip-flop 12–2*a*, to the decoder 16*c* via the flip-flops 12–2*a* and 12–2*b* and to the decoder 16*d* via the flip-flops 12–2*a*, 12–2*b* and 12–2*c* and via output switches 17–2A and 17–2B. The output signal read out from the delay line 11–N is fed directly to the decoder 16*a*, to the decoder 16*b* via the flip-flop 12–N*a*, to the decoder 16*c* via the flip-flops 12–N*a* and 12–N*b* and to the decoder 16*d* via the flip-flops 12–N*a*, 12–N*b* and 12–N*c* and via output switches 17–NA and 17–NB.

Each of the decoders 16*a*, 16*b*, 16*c* and 16*d* is the same as the others of said decoders and each provides a four signal combination output signal at its output terminals 18–1, combination output signal at its output terminals 18–1, 18–2, 18–3 and 18–4, not shown for the decoders 16*a*, 16*b* and 16*c*, but shown for the decoder 16*d* as output terminals 18–*d*1, 18–*d*2, 18–*d*3 and 18–*d*4. The output signal read out from the delay line 11–M of the reserve logic circuits is fed directly to the decoder 16*a*, to the decoder 16*b* via the flip-flop 12–M*a*, to the decoder 16*c* via the flip-flops 12–M*a* and 12–M*b* and to the decoder 16*d* via the flip-flops 12–M*a*, 12–M*b* and 12–M*c* and via the output switches 17–1A, 17–1B, 17–2A, 17–2B . . . 17–NA, 17–NB when said output switches are in positions opposite those shown in FIG. 1.

A test circuit 19 provides a test signal input and feeds such test signal input to the delay line 11–1 via an input line 21–1 and the OR gate 15–1, to the delay line 11–2 via an input line 21–2 and the OR gate 15–2, to the delay line 11–N via an input line 21–N and the OR gate 15–N and to the delay line 11–M via an input line 21–M and an OR gate 15–M. The test signal is read out from each of the delay lines 11–1, 11–2 . . . 11–N and 11–M after a determined period of time.

After the test signal is read out from each of the delay lines 11–1, 11–2 . . . 11–N and 11–M, it is fed via the corresponding flip-flops to the test circuit 19. The test signal from the delay line 11–1 is thus fed to the test circuit 19 via an output line 22–1, from the delay line 11–2 via an output line 22–2, from the delay line 11–N via an output line 22–N and from the delay line 11–M via an output line 22–M.

The test circuit 19 checks each bit fed to it via the output lines 22–1, 22–2 . . . 22–N and 22–M and determines whether each bit is correct or incorrect by functioning in known manner to compare each bit of the input signals supplied via input lines 13–1, 13–2 . . . 13–N and the test signals supplied via input lines 21–1, 21–2 . . . 21–N. The test circuit 19 may comprise any suitable known circuit which functions in known manner to correct an incorrect bit of the information input signals. The correction is accomplished by a plurality of relays 14–1, 14–2 . . . 14–N which control the position of each of the input switches 14–1A, 14–2A . . . 14–NA, respectively, and by a plurality of relays 17–1, 17–2 . . . 17–N, which control the position of each of the output switches 17–1A, 17–1B, 17–2A, 17–2B . . . 17–NA, 17–NB, respectively.

When any of the relays 14–1, 14–2 . . . 14–N is energized, it moves the corresponding one of the input switches 14–1A, 14–2A . . . 14–NA to its position opposite that shown in FIG. 1, so that the input signal normally fed to the corresponding one of the delay lines 11–1, 11–2 . . . 11–N is fed to the reserve delay line 11–M via the corresponding one of input lines 23–M1, 23–M2 . . . 23–MN, input line 23–M and the OR gate 15–M.

When any of the relays 17–1, 17–2 . . . 17–N is energized, they move the corresponding ones of the output switches 17–1A, 17–1B, 17–2A, 17–2B . . . 17–NA, 17–NB to their positions opposite those shown in FIG. 1, so that the output signal from the corresponding one of the delay lines 11–1, 11–2 . . . 11–N normally fed to the decoder 16*d* and to the test circuit 19 is cut off from said decoder and the output signal from the reserve delay line 11–M is fed to the decoder 16*d* via the corresponding ones of said output switches.

The switch-over to the reserve logic circuit permits the operator or attendant to test and adjust or repair the malfunctioning logic circuit in use. When the energized one of the relays 14–1, 14–2 . . . 14–N is deenergized, it returns the corresponding one of the input switches 14–1A, 14–2A . . . 14–NA to its position shown in FIG. 1, so that the input signal is normally fed to the corresponding one of the delay lines 11–1, 11–2 . . . 11–N. When the energized one of the relays 17–1, 17–2 . . . 17–N is deenergized, it returns the corresponding ones of the output switches 17–1A, 17–1B, 17–2A, 17–2B . . . 17–NA, 17–NB to their positions shown in FIG. 1, so that the output signal from the corresponding one of the delay lines 11–1, 11–2 . . . 11–N is normally fed to the decoder 16*d*. The reserve logic circuit is then disconnected, as described, during normal operation.

Each of the delay lines 11–1, 11–2 . . . 11–N and 11–M may comprise any suitable delay line known in the art. Each of the flip-flops 12–1*a*, 12–1*b*, 12–1*c*, 12–2*a*, 12–2*b*, 12–2*c*, 12–N*a*, 12–N*b*, 12–N*c*, 12–M*a*, 12–M*b* and 12–M*c* may comprise any suitable flip-flop known in the art. Each of the decoders 16*a*, 16*b*, 16*c* and 16*d* may comprise any suitable decoder known in the art.

In accordance with the present invention, the reserve logic circuit is eliminated and the cost of the redundancy system is decreased without reducing its reliability in operation, by decreasing the degree of redundancy relative to that of the partial redundancy system of FIG. 1. Thus, for example, the logic circuits in use of the system of FIG. 1 function in accordance with a parity check code and provide a degree of redundancy of at least one bit and each bit is tested separately. In the error system of the present invention, the entire logic circuit of which a component is defective or operating improperly is blocked by a signal or logical condition "1."

FIG. 2 illustrates the error system of the present invention in simplified form. In the example of FIG. 2, it is assumed that the positive, "1" or signal logical condition is ground potental and the negative "0" or no signal logical condition is a negative potential. In FIG. 2, each of the N logic circuits comprises a delay line storage device 11–1, 11–2 . . . 11–N, respectively, and three bi-stable multivibrators or flip-flops connected in series with the corresponding delay line, as in FIG. 1.

Thus, flip-flops 12–1*a*, 12–1b and 12–1*c* are connected in series with the output of the delay line 11–1, flip-flops 12–2*a*, 12–2*b* and 12–2*c* are connected in series with the output of the delay line 11–2, and flip-flops 12–N*a*, 12–N*b* and 12–N*c* are connected in series with the output of the delay line 11–N. In each of the N logic circuits, in normal operation, an input signal is fed through an input line 13–1, 13–2 . . . . 13–N, respectively, to the corresponding delay line 11–1, 11–2 . . . 11–N, respectively. The input signal is read out from each of the delay lines 11–1, 11–2 . . . 11–N, after a determined period of time. The output signal of each of the delay lines 11–1, 11–2 . . . 11–N is fed to four decoders.

The output signal read out from the delay line 11–1 is fed directly to a decoder 16*a*, to a decoder 16*b* via the flip-flop 12–1*a*, to a decoder 16*c* via the flip flops 12–1*a* and 12–1 *b*, and to a decoder 16*d* via the flip-flops 12–1*a*, 12–1*b* and 12–1*c*. The decoders 16*a*, 16*b*, 16*c* and 16*d* are the same in FIGS. 1, 2 and 3.

A test circuit 31–1 is connected to the outputs of the flip-flop 12–1*c* of the first logic circuit. A test circuit 31–2 is connected to the outputs of the flip-flop 12–2*c* of the second logic circuit. A test circuit 31–N is connected to the outputs of the flip-flop 12–N*c* of the Nth logic circuit. If, for example, the flip-flop 12–1*c* is determined by the test circuit 31–1 to be defective, it energizes a relay 32–1. The relay 32–1 is connected to the otuput of the test circuit 31–1, a relay 32–2 is connected to the output of the test circuit 31–2 and a relay 32–N is connected to the output of the test circuit 31–N.

When the relay 32–1 is energized, it moves a switch 32–1A to its position opposite that shown in FIG. 2, thereby applying ground potential to a plurality of diodes 33–1*a*, 33–1*b*, 33–1*c*, 33–1*d*, 33–1*e*, 33–1*f*, 33–1*g*, and 33–1*h*. The diodes 33–1*a* to 33–1*h* are connected in conducting direction with their anodes connected to a source 34–1 of negative potential and to the switch 32–1A via a common line 35–1. The common line 35–1 is connected to the source 34–1 of negative potential via a resistor 36–1. Thus, the diodes 33–1*a* to 33–1*h* normally conduct a negative potential to the components of the first logic circuit; the switch 32–1A being normally in its position shown in FIG. 2. When the switch 32–1A is moved to its position opposite that shown in FIG. 2, the diodes 33–1*a* to 33–1*h* conduct ground potential to the components of the first logic circuit.

Thus, if the test circuit 31–1 determines that the flip-flop 12–1*c*, for example, is defective, the relay 32–1A is energized and closes the switch 32–1A to apply ground potential to the inputs of each of the flip-flops 12–1*a*, 12–1*b* and 12–1*c* and to the outputs of each of these flip-flops as well as to the output of the delay line 11–1. The application of the ground potential or the logical "1" signal to the logic circuit functions to block the outputs of the components of said logic circuit; the delay line 11–1 and the flip-flops **12–1*a*, 12–1*b* and 12–1*c*, in this case. Although these components are blocked, the components of the other logic circuits provide their normal outputs at the correct output combinations of the decoders 16*a*, 16*b*, 16*c* and 16*d*. The components of the logic circuits function in accordance with an even parity check code and provide a four-element combination output signal at the output terminals 18–1, 18–2, 18–3 and 18–4 of the decoders 16*a*, 16*b*, 16*c*, and 16*d***.

If all the components, that is, the delay line 11–1 and the flip-flops **12–1*a*, 12–1*b* and 12–1*c* of the first logic circuit function properly, an output is provided at the output terminal 18–*d*2 of the decoder 16*d* of FIG. 2 only at certain times. The logical condition of each of the output lines 37–1*a*, 37–2*a* . . . 37–N*a* of the corresponding flip-flops 12–1*c*, 12–2*c* . . . 12–N*c* is "1" and the logical condition of each of the output lines 37–1*b*, 37–2*b*, . . . 37–N*b* of the corresponding ones of said flip-flops is "0." Even if, for example, the flip-flop 12–1*c* is defective so that both output lines 37–1*a* and 37–1*b* are blocked by logical condition "1," the logical signal "1" is provided only at the output terminal 18–*d*2 of the decoder 16*d* and the logical signal "0" is provided at each of the output terminals 18–*d*1, 18–*d*3 and 18–*d*4 of said decoder, so that the correct output is provided by said decoder. Whichever logic circuit component is defective in operation, as long as the defect is in a single such component, the output of the decoder and the operation of any circuitry connected to the output of the decoder is normal. Defective operation of a component before blocking of the logic circuit is checked and no signal or "0" is provided at each of the output terminals 18–1, 18–2, 18–3 and 18–4** of the decoder to avoid incorrect operation of the combined logic circuitry.

FIG. 3 illustrates the error system of the present invention in greater detail. FIG. 3 illustrates specific circuitry which may be utilized as each of the test circuits 31–1, 31–2 . . . 31–N and circuitry which may be utilized to unblock the logic circuits. In FIG. 3, the test circuit 31–1 is connected to the delay line 11–1 of the first logic circuit via leads **41–1*a* and 41–1*b*, an AND gate 42–1*a* and an OR gate 43–1 and to the flip-flop 12–1*c* of said first logic circuit via leads 44–1*a* and 44–1*b* connected to the input leads 37–1*a* and 37–1*b*, respectively. An identical test circuit 31–2, 31–3, 31–4 . . . 31–N is connected in the identical manner to the corresponding one of each of the other logic circuits. Thus, a test circuit 31–N is connected to the delay line 11–N of the Nth logic circuit via leads 41–N*a* and 41–N*b*, an AND gate 42–N*a* and an OR gate 43–N and to the flip-flop 12–N*c* of said Nth logic circuit via leads 44–N*a* and 44–N*b* connected to the output leads 37–N*a* and 37–N*b***, respectively.

The test circuit 31–1, which is the same as each of the other test circuits 31–2 . . . 31–N, comprises a reference signal source or generator 45–1, a test time signal or test clock source 46–1, a check circuit 47–1, a bistable multivibrator or flip-flop 48–1 and a blocking circuit 49–1. The check circuit 47–1 comprises an AND gate **51–1*a* and an AND gate 51–1*b* each having an output connected as an input of an OR gate 52–1. Each of the AND gates 51–1*a* and 51–1*b*** has three input leads.

The test clock 46–1, which may comprise any suitable source of test timing signals, is connected via a line 53–1 to a first input lead of each of the AND gates **51–1*a* and 51–1*b*; the line 41–1*b* being connected between one of the two input leads of the AND gate 42–1*a* of the first logic circuit and said first input lead of each of said AND gates 51–1*a* and 51–1*b*. One output of the reference signal source 45–1 is connected via a line 54–1*a* to a second input lead of the AND gate 51–1*a* and the other output of said reference signal source is connected via a line 54–1*b* to a second input lead of the AND gate 51–1*b*; the line 41–1*a* being connected between said second input lead of said AND gate 51–1*b* and the other of the two input leads of the AND gate 42–1*a* of the first logic circuit. The line 44–1*a* is connected to a third input lead of the AND gate 51–1*a* and the line 44–1*b* is connected to a third input lead of the AND gate 51–1*b***.

The output of the OR gate 52–1 of the check circuit 47–1 is connected to the inputs of the flip-flop 48–1 via a line 55–1 and an output of said flip-flop is connected to the input of the blocking circuit 49–1. The blocking circuit 49–1 comprises a relay driver or signal amplifier unit 56–1 connected to the output of the flip-flop 48–1 and the relay 32–1 connected to the output of said signal amplifier.

The reference signal source 45–1 alternately provides a signal or "1" and a no signal or "0" output and may comprise any suitable signal source for such operation such as, for example, an astable multivibrator. One of the two outputs of the reference signal source 45–1 is connected via lines **54–1*b* and 41–1*a* to an input of the AND gate 42–1*a* of the first logic circuit, so that the output signals of said signal source are fed to said AND gate. The output of the test clock 46–1 is connected via lines 53–1 and 41–1*b* to the other input of the AND gate 42–1*a* of the first logic circuit, so that the output signals of said test clock are fed to said AND gate. The test clock signals produced by the test clock 46–1 have the same period as the delay time of the delay line 11–1. When the logical condition of both lines 41–1*a* and 41–1*b* is "1" or there is a signal in both said lines, such signal "1" is stored in the delay line 11–1**.

When a "1" or signal is stored in the delay line 11–1 and derived from the output of said delay line, the flip-flops **12–1*a*, 12–1*b* and 12–1*c*, as well as said delay line, each produce a signal or "1" in one output such as, for example, the Set output, and no signal or "0" in the other output such as, for example, the Reset output. When a "0" or no signal is stored in the delay line 11–1, the flip-flops 12–1*a*, 12–1*b* and 12–1*c***, as well as said delay line, each produce no signal or "0" in the one output, which is the Set output in the present example, and a signal or "1" in the other output, which is the Reset output in the present example.

Thus, when a signal is stored in the delay line 11–1, there is a signal or "1" in the Set output **57–1*a*, 58–1*a*, 59–1*a* and 37–1*a* of each of said delay line and the flip-flops 12–1*a*, 12–1*b* and 12–1*c*, respectively, and there is no signal or "0" in the Reset output 57–1*b*, 58–1*b*, 59–1*b* and 37–1*b* of each of said delay line and said flip-flops, respectively. When a "0" or no signal is stored in the delay line 11–1, there is no signal or "0" in the Set output 57–1*a*, 58–1*a*, 59–1*a* and 37–1*a* of each of said delay line and the flip-flops 12–1*a*, 12–1*b* and 12–1*c*, respectively, and there is a signal or "1" in the Reset output 57–1*b*, 58–1*b*, 59–1*b* and 37–1*b*** of each of said delay line and said flip-flops, respectively.

Thus, if the components **11–1, 12–1*a*, 12–1*b* and 12–1*c* are functioning properly, when a test clock signal is provided by the test clock 46–1, a signal is provided in the output line 37–1*a* and no signal is provided in the output line 37–1*b* of the flip-flop 12–1*c*. Since the test clock signal is fed to both AND gates 51–1*a* and 51–1*b* of the check circuit 47–1, but one of said AND gates receives a signal and the other receives no signal from the reference signal source 45–1, the flip-flop 48–1 does not produce an energizing signal for the relay 32–1. If the Reset output 54–1*b* of the reference signal source 45–1 is then "0," the AND gate 42–1*a* is in non-conductive condition although a signal is provided at the same time by the test clock 46–1. The delay line 11–1 thus stores "0" or no signal, and if said delay line and the flip-flops 12–1*a*, 12–1*b* and 12–1*c* are functioning properly, upon the provision of the next time signal by the test clock 46–1 the output line 37–1*a* is "0" and the output line 37–1*b* is "1." Both AND gates 51–1*a* and 51–1*b* of the check circuit 47–1 are then in non-conductive condition and the relay 32–1** remains deenergized.

If a component of the logic circuit is defective or does not function properly, no signal or "0" may appear in the output line 37–1*a* and a signal or "1" may appear in the output line 37–1*b* when, if the defective component were functioning properly, the signal would appear in the output line 37–1*a* and no signal would appear in the output line 37–1*b*. In such case, the lines 41–1*a*, 41–1*b* and 37–1*b* are in "1" logical condition, so that the AND gate 51–1*b* of the check circuit 47–1 is switched to its conductive condition and conducts its input signal to the flip-flop 48–1 which provides a relay energizing signal which energizes the relay 32–1 via the relay driver 56–1.

If the defective component is merely temporarily defective and overcomes its improper operation to operate properly, the next time signal provided by the test clock 46–1 causes the AND gate 51–1*b* to switch to its non-conductive condition and cuts off the signal fed to the flip-flop 48–1 thereby cutting off the energizing signal provided by said flip-flop and deenergizing the relay 32–1.

If the defective component is permanently defective, however, the relay 32–1 remains energized. Energization of the relay 32–1 causes said relay to move each of the switches 32–1A, 32–1B and 32–1C to its position opposite that shown in FIG. 3. When the switch 32–1B is closed it closes a holding circuit for the relay 32–1 through a push button switch 61–1, so that said relay remains energized and maintains the components of the logic circuit in blocked condition via the switch 32–1A, a push button switch 62–1 and the diodes 33–1*a* to 33–1*h* in the manner described with reference to FIG. 2. The components of the first logic circuit are thus blocked by logical condition "1."

A second AND gate 42–1*b* in the input of the OR gate 43–1 is maintained in its non-conductive condition because although the switch 32–1C in its input line 63–1 is closed by the energized relay 32–1, a push button switch 64–1 is open. A third AND gate 42–1*c* is in its non-conductive condition since the switch 32–1A is then in its position opposite that shown in FIG. 3 so that it closes the ground potential circuit to the line 35–1 and opens said ground potential circuit to one of the inputs 65–1*a* of said third AND gate.

After the delay time has elapsed, the components of the logic circuits functioning properly are unblocked or released. The operator or attendant then adjusts, repairs or replaces the defective component, and closes the push button switch 64–1 to close the line 63–1 from the AND gate 42–1*b* to the output of a release or unblocking circuit 66 via the closed switch 32–1C. The outputs of the components of the first logic circuit are thus released or unblocked by the release circuit 66 via the push button switch 64–1. The release of the logic circuit components' outputs is provided when the logical condition of the Set outputs 57–1*a*, 58–1*a*, 59–1*a* and 37–1*a* is "0" and the logical condition of the Reset outputs 57–1*b*, 58–1*b*, 59–1*b* and 37–1*b* is "1."

A plurality of check circuits 67*a*, 67*b*, 67*c* and 67*d* are connected to the outputs of each of the components of each of the logic circuits. The check circuit 67*a* has two inputs connected to the Set and Reset outputs 57–1*a* . . . 57–N*a* and 57–1*b* . . . 57–N*b* of each of the delay lines 11–1 . . . 11–N via lines 68–1*a* . . . 68–N*a* and 68–1*b* . . . 68–N*b*, respectively. The check circuit 67*b* has two inputs connected to the Set and Reset outputs 58–1*a* . . . 58–N*a* and 58–1*b* . . . 58–N*b* of the flip-flops 12–1*a* . . . 12–N*a* via lines 69–1*a* . . . 69–N*a* and 69–1*b* . . . 69–N*b*, respectively. The check circuit 67*c* has two inputs connected to the Set and Reset outputs 59–1*a* . . . 59–N*a* and 59–1*b* . . . 59–N*b* of the flip-flops 12–1*b* . . . 12–N*b* via lines 71–1*a* . . . 71–N*a* and 71–1*b* . . . 71–N*b*, respectively. The check circuit 67*d* has two inputs connected to the Set and Reset outputs 37–1*a* . . . 37–N*a* and 37–1*b* . . . 37–N*b* of the flip-flops 12–1*c* . . . 12–N*c* via lines 72–1*a* . . . 72–N*a* and 72–1*b* . . . 72–N*b*, respectively.

The check circuit 67*a* has an output connected to one input 73*a* of two inputs 73*a* and 73*b* of an AND gate 74*a* of the release circuit 66. The check circuit 67*b* has an output connected to one input 75*a* of two inputs 75*a* and 75*b* of an AND gate 74*b* of the release circuit 66. The check circuit 67*c* has an output connected to one input 76*a* of two inputs 76*a* and 76*b* of an AND gate 74*c* of the release circuit 66. The check circuit 67*d* has an output connected to one input 77*a* of two inputs 77*a* and 77*b* of an AND gate 74*d* of the release circuit 66. The release circuit 66 also includes an OR gate 78 of which the inputs are the outputs of the AND gates 74*a* to 74*d* and having an output connected to the push button switch 64–1 via an inverter 79. The inverter 79 may comprise any suitable known inverter, as may comprise an inverter 81–1 connected in the Reset input of the flip-flop 48–1 of the test circuit 31–1. Each of the AND gates and OR gates utilized in the error system of the present invention may comprise any suitable known AND gate and OR gate respectively.

The other inputs 73*b*, 75*b*, 76*b* and 77*b*, respectively, of each of the AND gates 74*a*, 74*b*, 74*c* and 74*d*, respectively, is connected to the test clock 46–1 via a line 82, so that time signals are fed to each of said inputs. In the illustrated embodiment of the present invention, each time channel is divided into four time positions; the time signal in the first time position being fed to the AND gate 74*a*, the time signal in the second time position being fed to the AND gate 74*b*, the time signal in the third time position being fed to the AND gate 74*c* and the time signal in the fourth time position being fed to the AND gate 74*d*.

The check circuits 67*a* to 67*d* thus check the condition of the logic circuit components at each time position of each channel. If the components of the first logic circuit, for example, are functioning properly and the logical condition of the output line 37–1*a* is "0" and the logical condition of the output line 37–1*b* is "1," the logical condition of the output of each of the check circuits 67*a*, 67*b*, 67*c* and 67*d* is "1." The AND gates 74*a*, 74*b*, 74*c* and 74*d* are all in conductive condition, so the output signals of the check circuits 67*a* to 67*d* are fed to the inverter 79 via said AND gates and the OR gate 78.

The inverter 79 functions in the usual manner of an inverter to convert a signal or "1" to no signal or "0" and to convert no signal or "0" to a signal or "1." Thus, when the signal is fed to the inverter 79, said inverter produces a no signal or "0" output, so that no signal is stored in the delay line 11–1 via the AND gate 42–1*b*. Since the logical condition of the delay line 11–1 output is "0" after the elapse of the determined delay time after the closing of the push button switch 64–1, each component 11–1, 12–1*a*, 12–1*b* and 12–1*c* of the first logic circuit provides a logical condition of "0" in its Set output 57–1*a*, 58–1*a*, 59–1*a* and 37–1*a*, respectively, and a logical condition of "1" in its Reset output 57–1*b*, 58–1*b*, 59–1*b* and 37–1*b*, respectively, and each component is therefore unblocked or released.

If the check circuits 67*a* to 67*d* determine that a component of the logic circuit is not functioning properly and the logical condition of the output line 37–1*a* is "0" and the logical condition of the output line 37–1*b* is "1," the logical condition of the output of each of the check circuits 67*a*, 67*b*, 67*c* and 67*d* is "0." The AND gates 74*a* to 74*d* are thus switched to their non-conductive condition and no signal is fed to the inverter 79 which then produces an output signal or "1." The output signal of the inverter 79 is stored in the delay line 11–1 via the AND gate 42–1*b*.

Since the logical condition of the delay line 11–1 output is "1" after the elapse of the determined delay time after the closing of the push button switch 64–1, each component 11–1, 12–1a, 12–1b and 12–1c of the first logic circuit provides a logical condition of "1" in its Set output 57–1a, 58–1a, 59–1a and 37–1a, respectively, and a logical condition of "0" in its Reset output 57–1b, 58–1b, 59–1a and 37–1a, respectively, and each component is therefore unblocked or released. Thus, after the elapse of a period of time equal to the determined delay time after the closing of the push button switch 64–1 by the operator or attendant, the components of the logic circuits are returned to their normal or proper operating conditions.

When the push button switch 64–1 is closed to release the logic circuit components from their blocked condition, the push button switch 61–1 is opened to open the relay holding circuit. If, however, the relay 32–1 is of delayed action type and requires a time period longer than the delay time of the delay lines to become deenergized, said relay is deenergized after the components of the logic circuit have been returned to their normal operating condition. When the relay 32–1 is deenergized, the push button switch 64–1 is released or opened by the operator or attendant.

The release circuit 66 may be utilized with a plurality of logic circuits, so that a few, or even one, of said release circuits may be utilized in the error system of the present invention. It is possible to eliminate the test circuits by testing in series a plurality of components of different logic circuits. Although the test circuits may be thus eliminated, the test time signals which would be thus fed to such components would not be coincident with the time signals fed to the check circuit of the test circuit of the disclosed error system, and the release circuit would include additional components.

The error system of the present invention may be utilized with other types of circuits and logic circuits than those disclosed such as, for example, cyclic access memories, core translators, read out circuits for these components, and various combinations.

While the invention has been described by means of specific examples and in a specific embodiment, we do not wish to be limited thereto for obvious modifications will occur to those skilled in the art without departing from the spirit and scope of the invention.

We claim:

1. An error system, comprising a logic circuit having a plurality of components connected to each other, each of said components having an input and an output and normally functioning to provide an output signal at its output dependent upon an input signal at its input in occurrence and in characteristic;

blocking voltage means for providing a blocking voltage;

testing means connected to the output of a component of said logic circuit for determining the output signal occurrence and characteristic and thereby providing a signal indicative of the operating condition of said component; and control means responsive to said testing means for connecting said blocking voltage means to the output of each of the components of said logic circuit to provide a determined logical condition at the output of each of said components thereby blocking said components upon a determination by said testing means of improper operation of one of said components.

2. An error system as claimed in claim 1, wherein each of said components has a pair of inputs and a pair of outputs, the outputs of each of said components being connected to the inputs of the next succeeding component.

3. An error system as claimed in claim 1, wherein said components are connected in series circuit arrangement with each other and said testing means is connected to the output of the last component of said series circuit arrangement.

4. An error system, comprising a logic circuit having a plurality of components connected to each other, each of said components having a pair of inputs and a pair of outputs and normally functioning in a binary manner to provide a binary logical output condition at its outputs dependent upon a binary logical input condition at its inputs;

normal voltage means connected to the outputs of each of the components of said logic circuit for providing a normal operating voltage and thereby providing a determined logical output condition at the outputs of each of said components;

blocking voltage means for providing a blocking voltage;

testing means connected to the outputs of a component of said logic circuit for determining the logical output condition and thereby providing a signal indicative of the operating condition of said component; and control means responsive to said testing means for connecting said blocking voltage means in place of said normal voltage means to the outputs of each of the components of said logic circuit to provide a logical binary condition opposite said determined logical condition at the outputs of each of said components thereby blocking said components upon a determination by said testing means of improper operation of one of said components.

5. An error system as claimed in claim 4, wherein said determined logical condition is "0" and the logical binary condition opposite said determined logical condition is "1."

6. An error system as claimed in claim 4, wherein said normal operating voltage is a negative voltage providing a logical condition "0" and said blocking voltage is a voltage more positive than said negative voltage and providing a logical condition "1."

7. An error system as claimed in claim 4, wherein said normal operating voltage is a negative voltage providing a logical condition "0" and said blocking voltage is at ground potential and providing a logical condition "1."

8. An error system as claimed in claim 4, wherein said components are connected in series circuit arrangement with each other and include delay line means followed by a plurality of bistable multivibrator means and said testing means is connected to the outputs of the last bistable multivibrator means of said series circuit arrangement.

9. An error system as claimed in claim 4, further comprising release means connected to the outputs of each of the components of said logic circuit and to the inputs of the first of said components for connecting said normal voltage means in place of said blocking voltage means to the outputs of each of said components to provide said determined logical output condition at the outputs of each of said components after a detetrmined time relay.

10. An error system as claimed in claim 4, further comprising a plurality of diodes connected between said normal and blocking voltage means and the outputs of each of the components of said logic circuit.

11. An error system as claimed in claim 4, further comprising a plurality of decoder means each connected to the outputs of a corresponding one of each of said components of said logic circuit.

12. An error system as claimed in claim 4, wherein said components are connected in series circuit arrangement with each other and include delay line means followed by a plurality of bistable multivibrator means and said testing means is connected to the outputs of the last bistable multivibrator means of said series circuit arrangement and wherein said normal operating voltage is a negative voltage providing a logical condition "0" and said blocking voltage is a voltage more positive than said negative voltage and providing a logical condition "1,"

and further comprising release means connected to the outputs of each of the components of said logic circuit and to the inputs of the first of said components for connecting said normal voltage means in place of said blocking voltage means to the outputs of each of said components to provide said determined logical output condition at the outputs of each of said components after a determined time delay, a plurality of diodes connected between said normal and blocking voltage means and the outputs of each of the components of said logic circuit, and a plurality of decoder means each connected to the outputs of a corresponding one of each of said components of said logic circuit.

References Cited

UNITED STATES PATENTS

| | | | |
|---|---|---|---|
| 3,170,071 | 2/1965 | Griesmer et al. | 307—219 |
| 3,235,842 | 2/1966 | Roth et al. | 307—204 X |

MALCOLM A. MORRISON, *Primary Examiner.*

CHARLES E. ATKINSON, *Assistant Examiner.*

U.S. Cl. X.R.

235—153; 307—204; 340—147